Patented Apr. 6, 1943

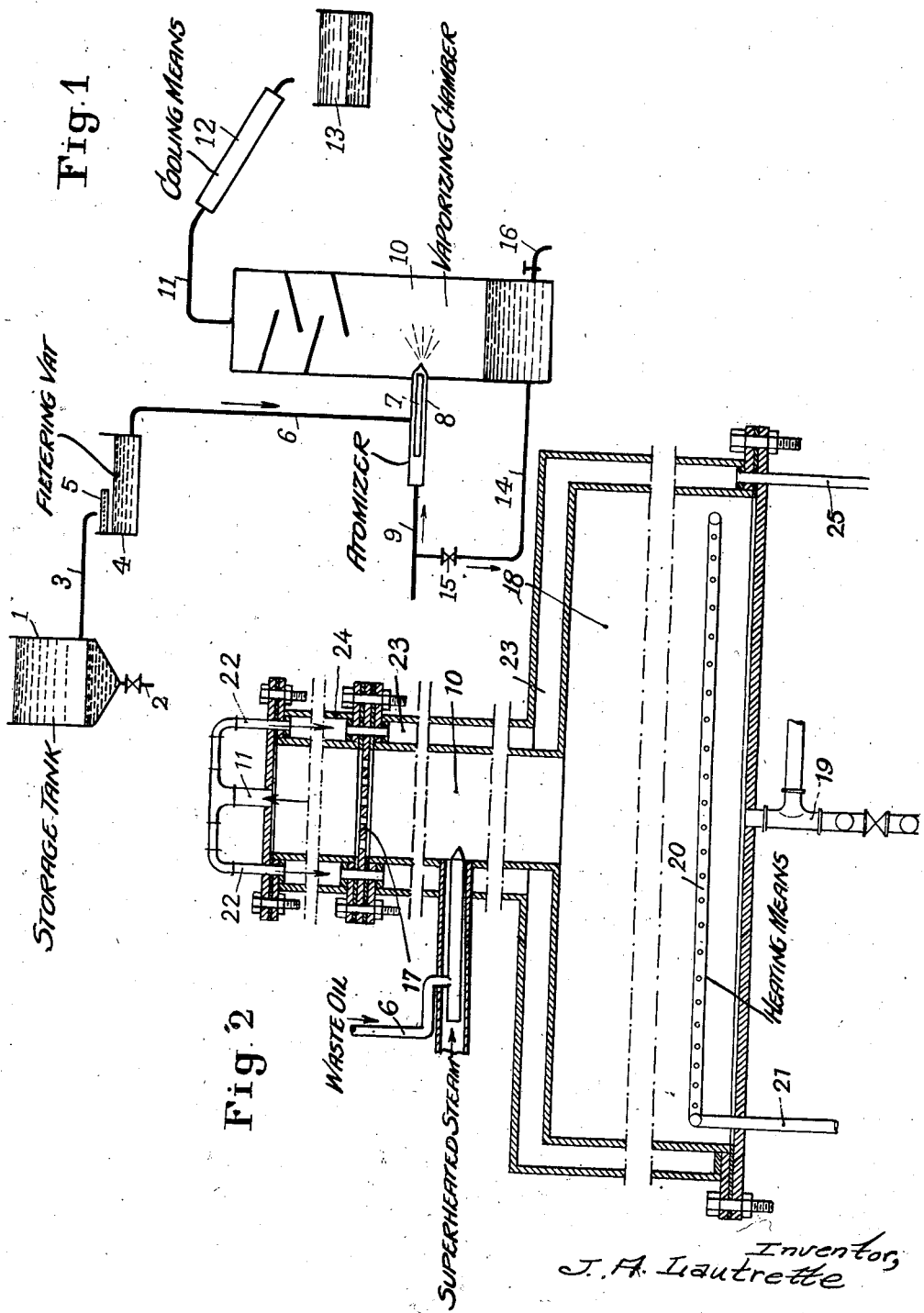

2,315,861

UNITED STATES PATENT OFFICE 2,315,861

TREATMENT OF CRANKCASE OIL

Jean André Lautrette, Paris, France; vested in the Alien Property Custodian

Application July 19, 1939, Serial No. 285,464
In France September 9, 1939

1 Claim. (Cl. 196—16)

The present invention relates to apparatus for treating waste crankcase oil.

For distilling liquids and more especially mixtures of liquids for the purpose of recovering one of the liquids, it has been proposed to heat the whole of the mixture to a determined temperature vaporizing all the elements of the liquid and subsequently to obtain by cooling in appropriate columns the condensation of the various suitably separated vapours, it being possible afterwards to recover the liquids thus obtained. However, the practically static heating of the mixture of liquids to be separated will only allow of rather slow separating of the elements, which necessitates installing after the heating boiler, complex and expensive plant, thus actually providing for distillation.

The present invention remedies these disadvantages by subjecting the mixture of liquids to both thermal and dynamic action by causing it to be atomized, for example, by a compressible fluid at a suitable temperature and pressure, such as superheated steam under pressure, for the purpose of rapidly producing vaporization of the mixture as a result of its extreme division into very fine particles, and of causing the light elements to be carried upward, while the heavy elements of the mixture gather at the bottom of the treatment enclosure after condensation, so that from the beginning of the treatment perceptibly complete separation is effected, which may possibly be followed by one or more distillations.

Other features and objects of the invention will be apparent from a consideration of the annexed drawing and the following description wherein an exemplary embodiment of the invention is disclosed.

In the drawing:

Fig. 1 is a diagrammatic sectional view of apparatus embodying the invention.

Fig. 2 is a sectional view showing details of a modified vaporizing chamber.

The plant includes a tank 1, in which are stored the liquids or mixtures of liquids to be recovered. This tank has at the bottom a drain cock 2, while at a certain distance from the bottom of the tank there is a waste pipe 3 opening into a filtering vat 4 provided with a suitable filter 5.

The vat 4 is connected at the bottom by pipe 6 to an inner nozzle 7 of an atomizer whose outer nozzle 8 is provided with an admission pipe for superheated steam under pressure. This atomizer opens into a column 10 provided with trays, from the top of which column an outlet pipe 11 extends, along the course of which is arranged a suitable refrigerating medium 12 and which leads into a collector 13.

A by-pass pipe 14 provided with a cock 15 extends from the admission pipe 9 for superheated steam under pressure to the bottom of column 10. This column is provided at the bottom with a drain cock 16.

In the preferred form shown in Fig. 2, the nozzle 8 of the atomizer leads into the lower half of the column 10, which is divided in its height into two sections by a perforated plate 17. This column 10 communicates through its lower part with tank 18, which is provided with a discharge pipe 19 and also a heating distributor 20 to which the steam is fed by a pipe 21.

The outlet pipe 11 leading from the upper portion of column 10 divides into branches 22 which lead into the upper end of an annular chamber 23 formed around the column 10 by a second casing 24. This double casing extends throughout the height of the column 10 and also surrounds the tank 18. A discharge pipe 25 at the lower end of annular chamber 23 forming a double casing leads to a refrigerating medium diagrammatically shown at 12 in Fig. 1.

The engine waste oil with which gas oil is mixed is collected in the tank 1, where the water or other foreign matter heavier than the oil can collect at the bottom of the tank where it is drawn off by the drain cock 2. For the purpose of separating lubricating oil and fuel, this mixture is driven through the pipe 3 into the filtering vat 4, the solid impurities being eliminated when passing through the filter 5.

The mixture of liquids then flows through the pipe 6 into inner nozzle 7 of the atomizer to which superhead steam, under pressure, at about 250 to 400° C. is fed through the pipe 9.

Each molecule of the liquid mixture which arrives in the inner nozzle 7 is subjected to the simultaneous action of the high temperature of the superheated steam under pressure and the mechanical impact of that steam which violently ejects these various molecules of the fluid mixture through the nozzle of the atomizer, producing atomization of the liquid mixture when in contact with the high temperature steam. As a result of this double action the constituent parts of the liquid mixture separate and the oil, which is heavier, collects in the tank 18 at the lower part of the column 10, while the gas oil mixed with the steam rises in the colum 10, whence it escapes at the top through the pipe 11. The mixture of gas oil and steam is brought back through branches 22 to the annular chamber 23, constituting an efficient insulating medium both for the column 10 and for the tank 18 with respect to the outer air, while subjecting the mixture of gas oil and steam to preliminary cooling. This mixture of steam and gas oil is collected in the refrigerating medium 12 where the steam and the gas oil condense and then reassemble in the collecting tank 13 where, owing to the differences in density, the separating of the condensed gas oil from the water takes place automatically.

The oil, which is collected in the tank 18, is subjected to suitable heating by means of a stem jet pipe 20, so as to complete the removal of the gas oil from this oil. The gas oil that comes off rises in the column 10 where it mixes with the part of the gas oil carried away by the steam, while the oil remains at the bottom of the tank 18 from which it can be drawn off.

The size of the different elements may of course vary according to the quantities and nature of the liquids to be separated, it being possible for the atomization to be carried out with the aid of a suitable fluid under suitable pressure at a suitable temperature. The liquid to be treated may be heated previously to its transfer to atomizer. Instead of superheated steam, it would be possible to use, for example, compressed air suitably preheated, or some other gas or vapour. The atomizer may take any desired shape and the atomizing may be carried out mechanically or under load.

The invention applies to the separation of the liquids mixed for the purpose of recovering the individual liquids, and in general it may also apply to the distilling of any liquids.

What I claim is:

Apparatus for treating waste crankcase oil, comprising an enlarged vaporizing chamber, an atomizer in communication with said chamber, a conduit for introducing a stream of superheated gaseous fluid under pressure into said atomizer, a second conduit for introducing a stream of waste crankcase oil into said atomizer, whereby said oil is subjected to dynamic and thermal treatments therein, an annular insulating jacket surrounding said vaporizing chamber, baffle means in the upper portion of said vaporizing chamber for separating liquids from vapors, an outlet for the vaporized lighter constituents in the upper portion of said chamber, said outlet communicating with said annular jacket whereby the vaporized lighter constituents act as an insulating medium between the vaporizing chamber and the atmosphere and are pre-cooled therein, means in the lower portion of said vaporizing chamber for heating the unvaporized heavier constituents, and means for condensing said vaporized lighter constituents.

JEAN ANDRÉ LAUTRETTE.